United States Patent
Dittmann et al.

(10) Patent No.: US 6,881,328 B2
(45) Date of Patent: Apr. 19, 2005

(54) METHOD FOR EVACUATING WATER THAT HAS BEEN SEPARATED IN A FUEL FILTER AND A DEVICE FOR CARRYING OUT SAID METHOD

(75) Inventors: Jörg Dittmann, Stuttgart (DE); Matthias Gänswein, Esslingen (DE); Edson Manzato, Modi Mirim (BR); Frank Metz, Leutenbach (DE); Ricardo De Abreu, Venhedo (BR)

(73) Assignee: Mahle Filtersysteme GmbH, Stuttgart (DE)

( * ) Notice: Subject to any disclaimer, the term of this patent is extended or adjusted under 35 U.S.C. 154(b) by 0 days.

(21) Appl. No.: 10/250,398

(22) PCT Filed: May 15, 2002

(86) PCT No.: PCT/DE02/01732

§ 371 (c)(1), (2), (4) Date: Jun. 27, 2003

(87) PCT Pub. No.: WO02/095211

PCT Pub. Date: Nov. 28, 2002

(65) Prior Publication Data

US 2004/0050804 A1 Mar. 18, 2004

(30) Foreign Application Priority Data

May 22, 2001 (DE) .......................................... 101 24 883
May 22, 2001 (DE) .......................................... 101 24 887
Dec. 27, 2001 (DE) .......................................... 101 63 770

(51) Int. Cl.$^7$ .......................... B01D 17/02; F02M 37/22
(52) U.S. Cl. ........................ 210/86; 210/799; 210/104; 210/109; 210/248; 210/416.4
(58) Field of Search .............................. 210/744, 799, 210/86, 104, 109, 136, 248, 416.4

(56) References Cited

U.S. PATENT DOCUMENTS

| | | | | | |
|---|---|---|---|---|---|
| 4,091,265 A | * | 5/1978 | Richards et al. | ............. | 219/501 |
| 4,491,143 A | * | 1/1985 | Yasuhara | ..................... | 137/172 |
| 4,495,069 A | * | 1/1985 | Davis | ......................... | 210/114 |
| 4,519,349 A | * | 5/1985 | Cheney | .................. | 123/198 R |
| 4,933,093 A | * | 6/1990 | Keller | ......................... | 210/774 |
| 5,368,001 A | * | 11/1994 | Roche | ......................... | 123/510 |
| 5,458,767 A | * | 10/1995 | Stone | .......................... | 210/90 |
| 5,534,161 A | * | 7/1996 | Tarr et al. | ................... | 210/744 |
| 5,922,199 A | * | 7/1999 | Hodgkins | .................... | 210/256 |
| 6,159,383 A | * | 12/2000 | Gullett et al. | ................ | 210/741 |
| 6,248,236 B1 | * | 6/2001 | Hodgkins | ................... | 210/232 |
| 6,361,684 B1 | * | 3/2002 | Hawkins et al. | .............. | 210/91 |
| 6,371,087 B1 | * | 4/2002 | Condran et al. | ............. | 123/510 |
| 2004/0050804 A1 | * | 3/2004 | Dittmann et al. | ........... | 210/799 |

FOREIGN PATENT DOCUMENTS

DE 33 25 772 1/1985
DE 4409570 5/1995

(Continued)

*Primary Examiner*—Robert James Popovics
(74) *Attorney, Agent, or Firm*—Collard & Roe, P.C.

(57) ABSTRACT

A method for directly evacuating water that has been separated from the filtered fuel in a fuel filter and has settled in a water collection chamber (4) of the fuel filter to an evacuation area that lies above the water level, by opening a shut-off valve (7), which leads to the exterior of the fuel filter and is connected in a water-conductive manner to the water collection chamber (4). Said evacuation takes place under a pressure that is higher in the water collection chamber (4) in relation to the evacuation area, whereby said pressure differential is created either by the operating pressure within the fuel filter during operation, or by a negative pressure that is applied externally. The method permits the simple evacuation of water form the interior of a fuel filter by a method that is not based on gravity. The inventive method can be implemented in a particularly advantageous manner, using specially configured fuel filters.

9 Claims, 3 Drawing Sheets

FOREIGN PATENT DOCUMENTS

Figure 1:
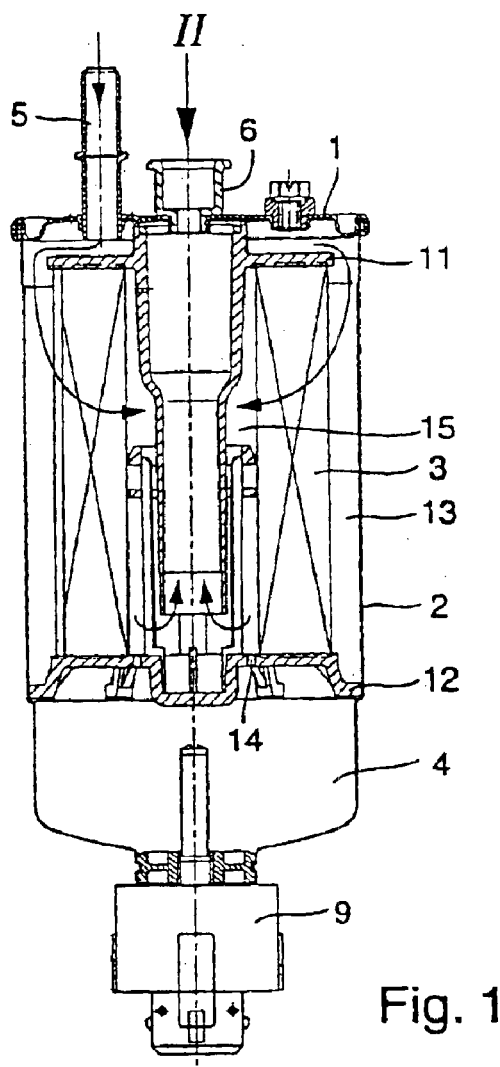

| | | |
|---|---|---|
| DE | 9408687 | 9/1995 |
| DE | 94 08 687 | 11/1995 |
| DE | 195 45 133 | 6/1997 |
| DE | 197 37 192 | 3/1999 |
| DE | 197 37 264 | 3/1999 |
| DE | 100 29 539 | 12/2001 |
| EP | 0292446 | 11/1988 |
| EP | 0 715 873 | 6/1996 |
| EP | 0 777 046 | 6/1997 |
| EP | 0806564 | 11/1997 |
| EP | 0 943 796 | 2/1999 |
| EP | 0 899 452 | 3/1999 |
| GB | 2 129 329 | 5/1984 |
| JP | 60122266 | 6/1985 |

* cited by examiner

METHOD FOR EVACUATING WATER THAT HAS BEEN SEPARATED IN A FUEL FILTER AND A DEVICE FOR CARRYING OUT SAID METHOD

CROSS REFERENCE TO RELATED APPLICATIONS

Applicants claim priority under 35 U.S.C. §119 of GERMAN Application No. 101 24 887.3 filed on 22 MAY 2001; GERMAN Application No. 101 24 883.0 filed on 22 MAY 2001 and GERMAN Application No. 101 63 770.5 filed on 27 DEC. 2001. Applicants also ,claim priority under 35 U.S.C. §365 of PCT/DEO2/01732 filed on MAY 15, 2002. The international application under PCT article 21(2) was not published in English.

The invention relates to a method for evacuating water that has been separated from a filtered fuel in a fuel filter and has settled in a water collection chamber of the fuel filter.

Fuel filters to which the method of the invention relates have until now always been constructed so that the separated water may flow out through an open valve by the force of gravity.

The invention is concerned with the challenge of also being able to install a fuel filter in an environment taking such conditions into account in such a way that it is not possible for the water to be evacuated by gravity.

One solution for such as case is suggested by the, method of the invention according to claim 1.

Useful and advantageous refinements of devices for carrying out the method of the invention constitute the object of the subordinate claims.

A fuel filter from which separated water may be removed according to the method of the invention has the considerable advantage that connections leading away from the filter may be attached to the same frontal surface of the filter housing, which may particularly be conformed as a cover attached to a filter pan. In a fuel filter that is installed with a "top cover", a water evacuation line must be provided for this purpose that runs inside the filter housing from the water collection chamber located at the bottom to the frontal surface of the fuel filter, which is located on the top of the filter. If a water level sensor device is present, this may be advantageously connected to or integrated with the water evacuation line.

If the pressure differential that must exist between the water collection chamber and the location at which the separated water is to be discharged is to be generated by the operating pressure of the filter and thus entails very high operating pressure, the shut-off valve that must be opened to allow the water to be discharged advantageously has the form of a pressure release valve. High operating pressures are present for example in a fuel filter for a combustion engine when the engine is running.

In the case of a combustion engine fuel filter, water may be evacuated for example fully automatically and controlled by sensors without any human intervention while the motor is running. The extracted water may be discharged to an unpressurised collection receptacle outside the filter, from which it may be evaporated in a manner similar to that of the automatic defrosting function of a refrigerator. Such removal by evaporation represents a special aspect of the present invention. Of course the water, which flows out of the filter under practically no pressure may be disposed of in any other way.

A standard vehicle tyre valve may be used quite simply as the pressure relief valve, and may of course also be adapted to the special application according to the invention.

The necessary overpressure between the water collection chamber and the place where the water is to be evacuated may also be generated with a suction pump working in conjunction with the shut-off valve.

Embodiments particularly illustrative of the invention are represented in the drawing.

Figure 4:
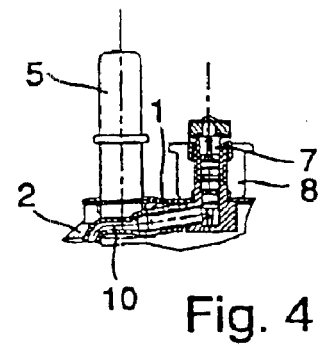
Figure 3:
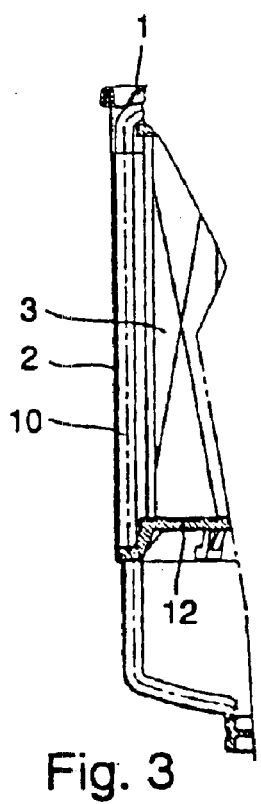
Figure 2:
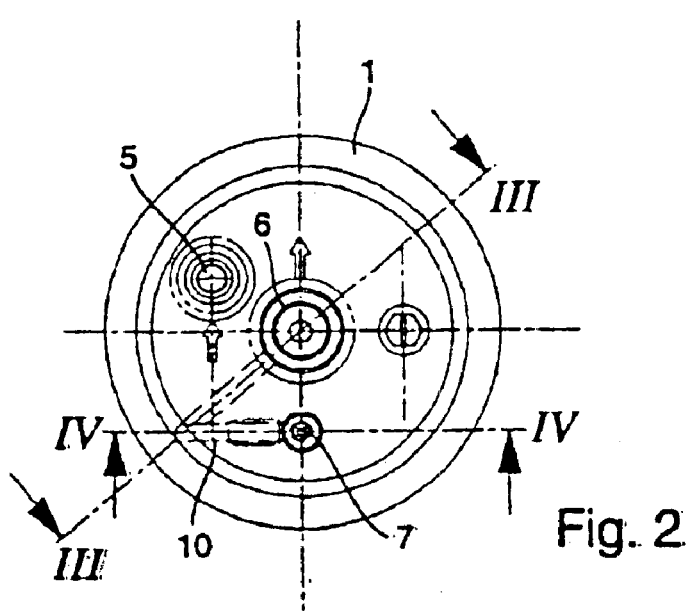
Figure 5:
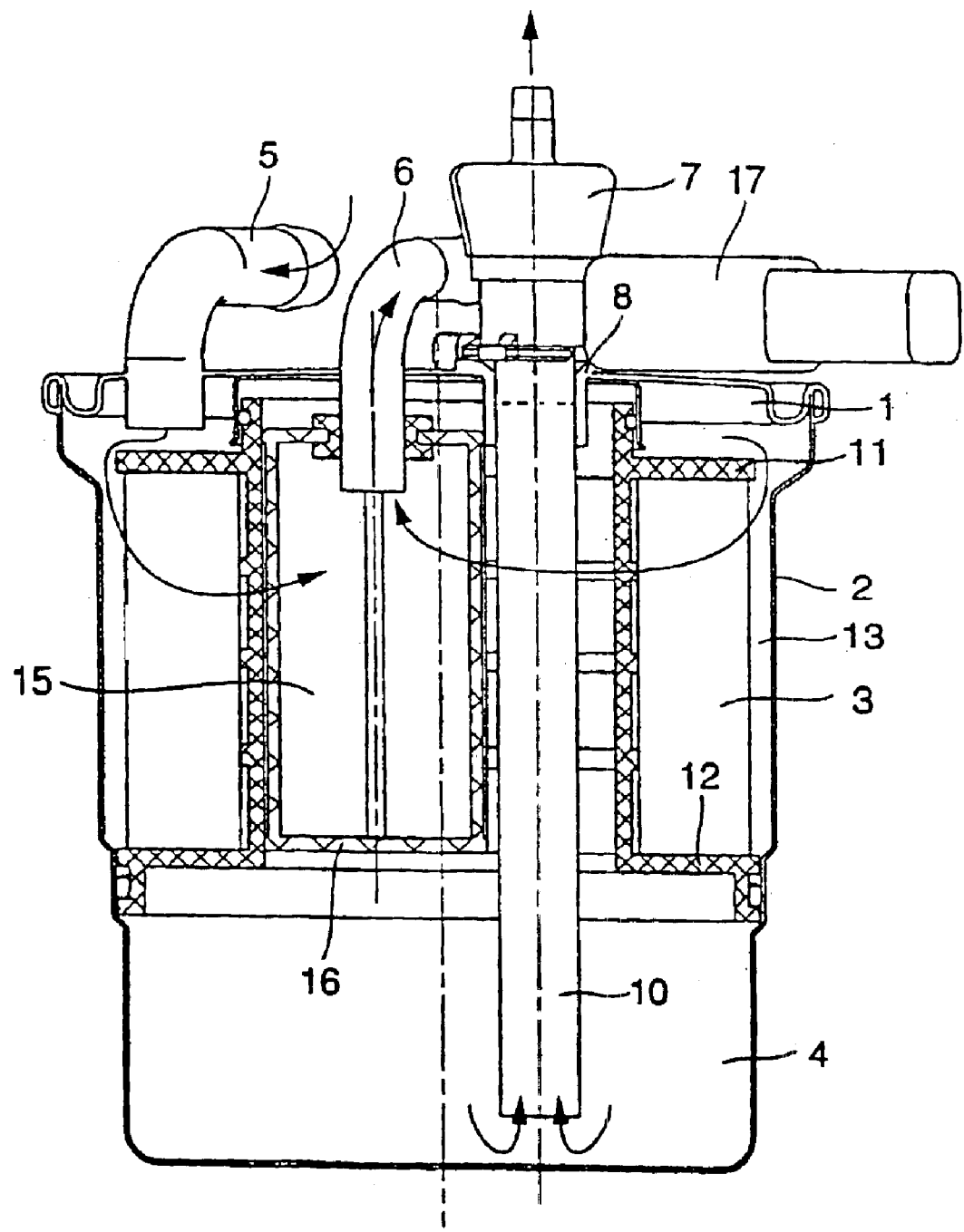
Figure 7:
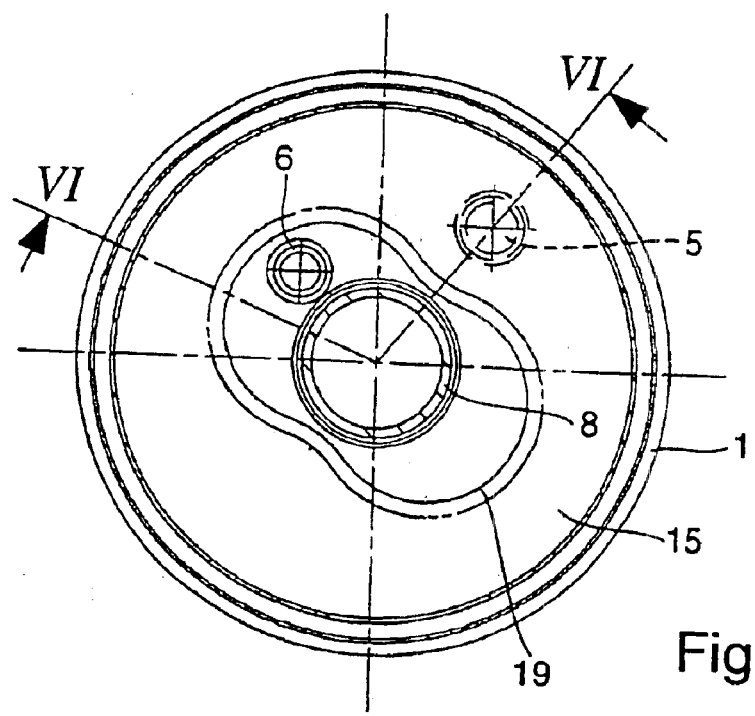
Figure 6:
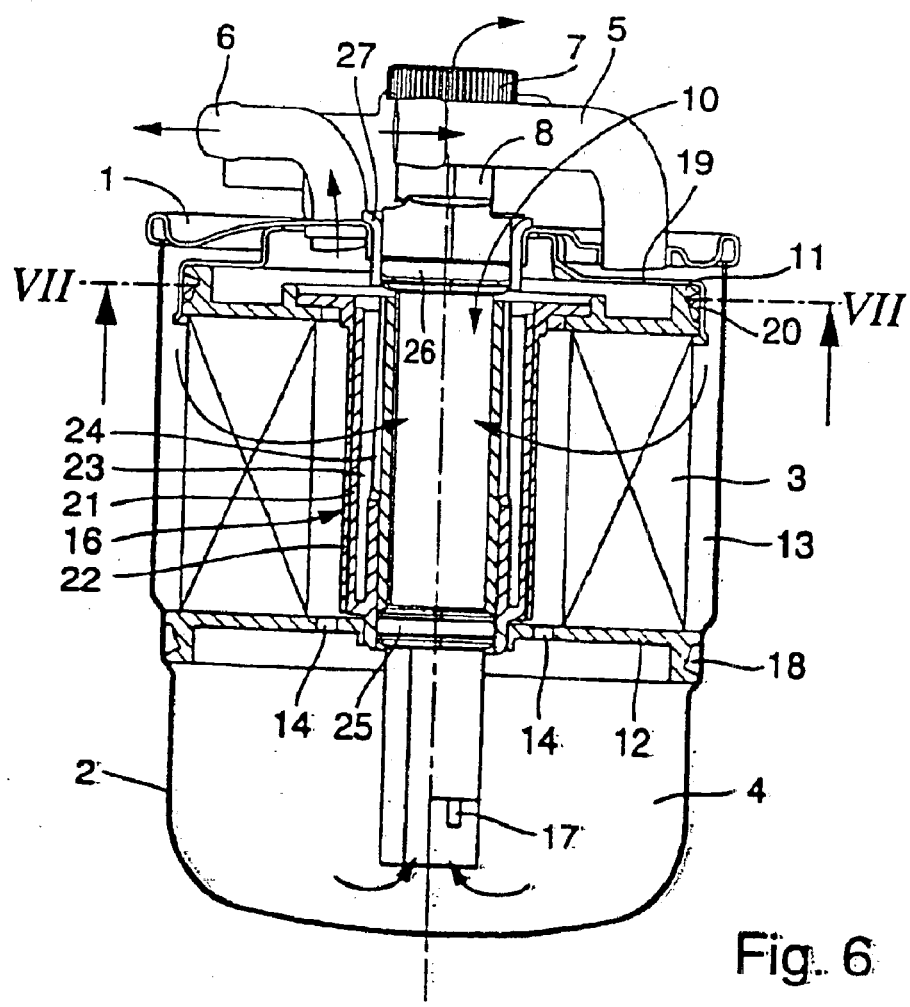

In the drawing:

FIG. 1 is a section through a pan-shaped fuel filter in a first variant,

FIG. 2 is a top view of the fuel filter in the direction of arrow II pointing towards the filter of FIG. 1, FIG. 3 is a cross-section of a partial representation along line III—III in FIG. 2, FIG. 4 is a sectional view of selected elements along line IV—IV through the fuel filter in FIG. 2, FIG. 5 is a section through a fuel filter in an alternative configuration, FIG. 6 is a section through a fuel filter in a further alternative configuration along line VI—VI in FIG. 7, FIG. 7 is a cross-section through the upper area in the interior of the fuel filter in FIG. 6.

FUEL FILTERS ACCORDING TO FIGS. 1 TO 4

An annular filter insert 3 allowing direct flow radially from the outside inward is located in housing pan 2 of a vehicle combustion engine, which pan is closed with a cover 1. The fuel filter is mounted vertically relative to the combustion engine, that is to say it is arranged so that the axis of annular filter insert 3 is congruent with the vertical axis of the vehicle, cover 1 being located on top. At the bottom of housing pan 2, a water collection chamber 4 is provided to collect water that is precipitated inside the fuel filter.

Port elements leading into and out of the filter interior are provided inside cover 1, specifically an inlet port element 5 that feeds fuel into the filter, an outlet port element 6 that transports cleaned fuel away, and a water discharge element 8 equipped with a shut-off valve 7.

A water level sensor device 9 protrudes into water collection chamber 4 from below. Such a sensor device 9 may also be eliminated entirely in a fuel filter that is to be evacuated of separated water according to the method of the invention. If a water level sensor device 9 is present, this may send a signal for water evacuation or it may automatically open shut-off valve 7 for example with the use of a motor drive for automatic water evacuation.

Shut-off valve 7 may have the particularly economical form of a standard vehicle tyre valve. Water discharge port 8 and thus also shut-off valve 7 is connected to water collection chamber 4 via a connection hose 10 made for example from a flexible plastic material. This hose runs in the untreated side of the annular filter insert in a space between annular filter insert 3 and the outer wall of housing pan 2.

Annular filter insert 3 is furnished with an upper and a lower end plate, respectively 11 and 12. Annular filter insert 3 is insulated from housing pan 2 by lower end plate 12. Meanwhile, upper end plate 11 is located at a distance from housing pan 2. Pipe space 13 of the fuel filter runs through this gap. The fuel filter flow is indicated by the flow arrows in FIG. 1.

The water separated in water collection chamber 4 may be discharged away from the fuel filter via connection hose 10 in extremely simple manner while the combustion engine is running, that is in a condition in which the fuel filter is under operating pressure, by opening shut-off valve 7. The period for which only water and no following fuel is removed may be controlled by water level sensor device 9, either automatically or by means of a signal display. Water collection chamber 4 is connected to clean fuel chamber 15 of the fuel filter via apertures 14. The water separated from the filtered fuel passes through apertures 14 into water collection chamber 4.

For the case in which water is not to be drained with the fuel filter under operating pressure, but with the aid of a suction pump, a simple shut-off valve capable of nothing more than an opening and closing function may be used as shut-off valve 7 instead of a pressure relief valve.

Fuel Filter According to FIG. 5

Parts that in FIG. 5 are functionally equivalent to those in the fuel filter of FIGS. 1 to 4 are indicated by the same reference numbers.

Unlike the configuration in FIGS. 1 to 4, in the special embodiment shown here the cleaned fuel passes through a water separation device 16 inside the filter before the outlet port element 6.

In this embodiment, connection hose 10 cooperates with a water level sensor device 17 which leads outward in the area of the same frontal surface of the fuel filter on which all ports leading to the outside are attached.

In principle, in all the configurations represented, shut-off valve 7 may be provided at any location in the areas of connection hose 10 transporting water to be evacuated. If the evacuated water is to be transported to a location away from the fuel filter, shut-off valve 7 may also be attached there. Thus a high degree of design flexibility is assured in respect of the place at which the extracted water is transported at atmospheric pressure, collected or evaporated. Shut-off valve 7 may be configured such that the water can exit the fuel filter for removal under very little pressure, either directly from the housing thereof or at a site removed therefrom.

Fuel Filters According to FIGS. 6 and 7

A special feature of the invention with this fuel filter consists in its design configuration, which enables all the ports required by a filter according to the invention to be attached without difficulty even for a frontal surface of relatively small diameter. Connection hose 10 is notably furnished with a sensor of a water level sensor device 17, which sensor protrudes into water collection chamber 4.

Shut-off valve 7 has the form of a screw that is rotatable from the outside, along whose axis water discharge port 8 is externally aligned in such manner that a line leading to a pump that can be connected externally may be attached temporarily for the purpose of evacuating water. If the screw of shut-off valve 7 is fully closed, the water evacuation port 8 is closed, whereas an opening is exposed when the valve is even partially unscrewed.

Annular filter insert 3 is furnished with axially sealing end plates, specifically an upper end plate 11 and a lower end plate 12. Annular filter insert 3 is insulated circumferentially from housing pan 2 by lower end plate 12 by means of a first square ring 18. This creates an untreated fuel chamber 13 between annular filter insert 3 and housing pan 2, which is insulated in the area of upper end plate 11 from a cleaned fuel chamber 15 that is connected to outlet port element 6.

A description of the seal construction follows.

Initially, upper end plate 11 is sealed circumferentially by means of a second square ring 20 in a connection wall 19 that is made for example from profiled sheet metal. For this purpose, upper end plate 11 abuts at its radially outer edge with connection wall 19 in a first, circularly cylindrical, collar-shaped and downwardly flared area thereof. This first cylindrical area has a circular cylindrical shape that corresponds with upper end plate 11 and is centred on the common axis of annular filter insert 3 and housing pan 2. Opposite cover 1, connection wall 19 is sealingly secured to cover 1 through a second cylindrical area for example by soldering. This second cylindrical area is not circularly cylindrical but has a kidney shaped outline. This kidney shape has the advantage that port elements 5 and 6, that is the feed and discharge ports, may be attached to cover 1 for an overall smaller outer circumference of cover 1. If the second cylindrical portion of the connection wall engaging with cover 1 were circular, the surface of cover 1 in the embodiment shown would no longer be sufficient to accommodate port element 5 when assigning to untreated fuel chamber 13. Cleaned fuel chamber 15 is radially adjacent the kidney shaped, second cylindrical area of connection wall 19 from the inside.

The flow of fuel through the fuel filter is indicated in the drawing by arrows.

The cleaned side of annular filter insert 3 in this, that is to say, water separation device 16 between end plates 11 and 12 thereof is located axially symmetrically. It consists of a type of cylindrical perforated basket 21, that is to say particularly a circular cylindrical structure, in which for example a fine sieve 23 distributed about the circumference between axially extending vanes 22 may project through the vanes 22. If water separation device 16 is made from plastic, this means that sieve 23 is moulded for example radially on both sides of the plastic of vanes 22. Radially inside perforated basket 21, inner axial vanes 24 are distributed radially about the circumference and radially separated from sieve 23, which may be supported thereby as necessary. Vanes 24 may extend freely at one axial end (uppermost in the drawing).

Radially inwardly, lower end plate 12 encloses at least approximately sealingly water separation device 16, that is to say apertures 14 distributed circumferentially at that location on sieve 23 lead into water collection chamber 4. Connection hose 10 together with water level sensor device 17, which is integral with this hose 10, is sealed radially outwardly in the area of upper and lower end plates 11, 12 of annular filter insert 3. In the area of lower end plate 12, this seal is provided against connection hose 10 by a first O-ring 25. In the area of upper end plate 11, a radial seal is assured by a second O-ring 26 against a seating 27 for discharge port 8.

Water level sensor device 17 forms an integral part of connection hose 10 and may be removed together therewith from the housing of the fuel filter through cover 1 thereof. In order to secure connection hose 10 inside cover 1, a bayonet socket not shown in the drawing is provided between cover 1 and connection hose 10, and may be further secured against coming loose by twisting.

In a fuel filter according to the invention, cover 1 and housing pan 2 are normally joined inseparably. However, this is does not have to be the case. Housing 2 and cover 1 are advantageously made from sheet metal. Connection wall 19 is also normally made from sheet metal. It is practical to make end plates 11 and 12 of annular filter insert 3 from plastic. It is also advantageous to make connection hose 10 from plastic. If the cover is made from metal, port elements 5 and 6 should also be made from metal.

Seating 27 for the port element 8 may also serve as the seating for inserts other than connection hose 10, in which case the advantages of the kidney shaped form of the collar-shaped connection wall 19 in the second cylindrical area thereof, in which this connection wall is attached to cover 1, may also be exploited to the full. Other inserts may be fuel heating device or valves, for example.

What is claimed is:

1. A fuel filter for a combustion engine having
    a filter insert allowing radial flow that is installed in alignment with the vertical axis of the vehicle,
    a water collection chamber equipped with a water evacuation device for water extracted from the fuel,
    a port for supply and discharge of fuel respectively on the untreated and clean sides in an identical axial first frontal area of the filter, located uppermost along the vertical axis of the vehicle,
    a connection hose enclosed by the water evacuation device and leading from the water collection chamber to a shut-off valve provided in the first frontal area of the fuel filter, wherein
    the connection hose (10) runs through the interior cavity at the center of the annular filter insert (3), wherein it passes through the first frontal surface of the fuel filter and is sealingly insulated therefrom,
    an upper, round ring end plate (11) of the annular filter insert (3) is assigned to and located at distance from the first frontal surface of the fuel filter,
    a connection wall (18) is provided in the space formed by the distance between the upper ring plate (11) and the first frontal surface of the fuel filter and has sealed connections, at one end with the upper end plate (11) and at the other end with the frontal surface of the fuel filter.

2. The fuel filter according to claim 1, wherein the connection hose (10) is arranged eccentrically within the center space inside the annular filter insert (3).

3. The fuel filter according to claim 2, wherein a hollow-cylindrical water separation device (16) is provided within the center space of the annular filter insert (3) and has liquid-permeable outer-walls,
    wherein the discharge port element (6) passes in sealed manner into the interior of the water separation device and from there extracts the cleaned fuel from inside the fuel filter.

4. The fuel filter according to claim 1, wherein
    the connection wall (18) is conformed in the respective connection areas,
    centrally round to the axis of the fuel filter at the upper end plate (11), and
    with varying radially outward distances relative to the axis of the fuel filter over its entire circumference at the frontal surface of the fuel filter.

5. The fuel filter according to claim 4, wherein
    a tubular sieve is included as a water separation device (16) downstream from the annular filter material and inside the treated fuel chamber (15).

6. The fuel filter according claim 1, wherein
    the annular filter insert (3) is radially outwardly sealed with its lower end plate (12) at the housing pan (12) and allows fluids to flow radially inwards from the periphery,
    the water collection chamber (4) is located below the lower end plate (12),
    the treated fuel chamber (15) in the radial center of the annular filter insert (3) is connected with the water collection chamber (4) to allow the transport of water,
    the connection hose (10) protrudes through the lower end plate (12) and is sealingly insulated therefrom.

7. The fuel filter according to claim 1, wherein
    the connection wall (18) is constructed in its connection area for the upper end plate (11) as a round collar, with which the upper end plate (11) engages radially from the inside, and is sealingly insulated therefrom by a radial seal (25).

8. The fuel filter according to claim 1, wherein
    the upper end plate (11) is made from plastic and the connection wall (18) is made from metal.

9. The fuel filter according to claim 1, wherein
    a water sensor device (9) is incorporated in the connection hose (10).

* * * * *